United States Patent
Figge et al.

(10) Patent No.: US 9,263,951 B2
(45) Date of Patent: Feb. 16, 2016

(54) LLC BALANCING

(71) Applicant: DET International Holding Limited, George Town, Grand Cayman, KY (US)

(72) Inventors: Heiko Figge, Medebach (DE); Frank Schafmeister, Warburg (DE); Tobias Grote, Luegde (DE)

(73) Assignee: DET INTERNATIONAL HOLDING LIMITED, George Town, Grand Cayman (KY)

( * ) Notice: Subject to any disclaimer, the term of this patent is extended or adjusted under 35 U.S.C. 154(b) by 219 days.

(21) Appl. No.: 13/934,971

(22) Filed: Jul. 3, 2013

(65) Prior Publication Data

US 2014/0009985 A1 Jan. 9, 2014

(30) Foreign Application Priority Data

Jul. 4, 2012 (EP) .................................... 12405061

(51) Int. Cl.
*H02J 1/10* (2006.01)
*H02M 3/158* (2006.01)
*H02M 3/28* (2006.01)
*H02M 3/337* (2006.01)

(52) U.S. Cl.
CPC .............. *H02M 3/1584* (2013.01); *H02M 3/28* (2013.01); *H02M 3/285* (2013.01); *H02M 3/337* (2013.01); *Y02B 70/1433* (2013.01)

(58) Field of Classification Search
USPC ............ 363/17, 21.02, 65, 67, 68, 69, 70, 89, 363/90; 307/43, 65, 82, 83
See application file for complete search history.

(56) References Cited

U.S. PATENT DOCUMENTS

| 5,886,885 A * | 3/1999 | Fujie ................................ 363/49 |
| 7,035,125 B2 * | 4/2006 | Yoshida .......................... 363/71 |
| 2009/0231887 A1 | 9/2009 | Ye et al. |
| 2010/0328968 A1 * | 12/2010 | Adragna et al. ........... 363/21.02 |
| 2011/0080146 A1 | 4/2011 | Li et al. |
| 2011/0089913 A1 * | 4/2011 | Li et al. ......................... 323/208 |

(Continued)

FOREIGN PATENT DOCUMENTS

| JP | 1-234086 A | 9/1989 |
| SU | 671012 A1 | 6/1979 |
| TW | 201103245 A | 1/2011 |

OTHER PUBLICATIONS

Jang et al., "Average Current Mode Control to Improve Current Distributions in Multi-Module Resonant dc-to-dc Converters," 8th International Conference on Power Electronics—ECCE Asia, May 30-Jun. 3, 2011, The Shilla Jeju, Korea, pp. 2312-2319.

(Continued)

*Primary Examiner* — Nguyen Tran
(74) *Attorney, Agent, or Firm* — Birch, Stewart, Kolasch & Birch, LLP

(57) ABSTRACT

A converter arrangement (C.5, C.7, C.8, C.9, C.11, C.12) with at least two single LLC converters (L), a pulse generator (2) per single LLC converter (L) wherein each pulse generator (2) is configured to supply switching pulses to one single LLC converter (L) and an output controller (11) configured to use switching frequency control and/or phase-shift control to control the pulse generators (2) comprises a load balancing control (7.5, 7.7, 7.8, 7.9, 7.11, 7.12) for overcoming unbalanced loading of the converter arrangement (C.5, C.7, C.8, C.9, C.11, C.12).

22 Claims, 7 Drawing Sheets

(56) References Cited

U.S. PATENT DOCUMENTS

2012/0081934 A1  4/2012  Garrity et al.
2012/0153730 A1  6/2012  Barnett et al.

OTHER PUBLICATIONS

Taiwanese Office Action mailed Dec. 8, 2014 with English Translation.

* cited by examiner

- Prior Art -

LLC BALANCING

TECHNICAL FIELD

The invention relates to a converter arrangement comprising at least two single LLC converters, one pulse generator per single LLC converter, wherein each pulse generator is configured to supply switching pulses to one single LLC converter, and an output controller configured to use switching frequency control and/or phase-shift control to control the pulse generators. In further, the invention relates to a method for operating said converter arrangements.

BACKGROUND ART

LLC resonant converters are more and more used in modern power supply designs due to their ability to operate with high efficiency at moderate circuit and control complexity. Moreover, the interleaving method, i.e. combining multiple single LLC resonant converters, in particular in parallel connections, is commonly used in modern power supply designs to increase the maximum output power per unit, to spread power losses, to apply phase shedding in light load operation and to decrease the size of input and output filters. Additional measures such as active current sharing control are usually necessary for interleaved converters to balance the load among the single converters. Using the LLC converter in a parallel connection requires load balancing as well, especially if standard component value precision (e.g. ±5%) of the resonant circuit elements is given based on economical and practical matters. Unfortunately using common active current sharing methods known from interleaved PWM converters has some major drawbacks for resonant converters and/or LLC converters in parallel connection: The switching frequencies of the paralleled converters would be close to each other but not perfectly the same, resulting in beat frequency effects that can be very critical to EMI requirements and thus afford extensive filtering. Also the desired current ripple cancellation effect of interleaved switching converters would not be in effect making again bigger filters necessary. Motivated by those issues, several workarounds to realize load balancing for interleaved LLC converters have been proposed (for example in US 20090231887), but these methods all have the disadvantage of reducing the reliability and practicability of the resulting LLC converter arrangement compared to the performance of the original LLC converter.

SUMMARY OF THE INVENTION

It is the object of the invention to create a converter arrangement pertaining to the technical field initially mentioned, that is able to overcome unbalanced loading of its different single LLC converters while maintaining a good reliability, practicability and efficiency of the converter arrangement.

The solution of the invention is specified by the features of claim 1. According to the invention, a converter arrangement, comprising
   at least two single LLC converters,
   one pulse generator per single LLC converter, wherein each pulse generator is configured to supply switching pulses to one single LLC converter and
   an output controller configured to use switching frequency control and/or phase-shift control to control the pulse generators,
comprises a load balancing control, for controlling load balancing of the converter arrangement.

In a typical embodiment, the converter arrangement is an LLC converter arrangement. In a preferred embodiment, each single LLC converter preferably comprises four switches. In further preferred embodiment, the converter arrangement comprises an input capacitor and an output capacitor. The load balancing control is preferably an active load balancing control.

Such a converter arrangement has the advantage that unbalanced loading of the different single LLC converters can be overcome in a reliable and convenient manner.

Power supply of the LLC converters can be done in various ways. For example by connecting them directly to an external power source such as an AC or DC line or by providing an externally fed power source and connecting each LLC converter to that power source.

In a preferred embodiment of the invention, the converter arrangement however comprises a source converter per LLC converter. The source converter is for example a power source converter such as a PFC boost converter. Each source converter is connected to an input of exactly one LLC converter to supply power, e.g. a supply voltage, to that LLC converter. Each source converter is configured to be fed by a common power source. This power source may either be a DC power source, an AC power source or an AC/DC combined power source. The source converters are preferably configured to receive a voltage at their input which means that the common power source preferably is a voltage source. In order to balance the load of the LLC converters, the load balancing control is configured to balance an input power of the source converters.

Input power balancing of the source converters generally may be achieved by controlling the input voltage, the input current or both. Since each source converter is connected to the same voltage source, the input voltage is identical for each source converter. Their input power will therefore be identical if also their input currents are identical. In a further preferred embodiment, the load balancing control therefore comprises a current regulator per source converter to balance the input power of the source converters by balancing an input current of the source converters. According to the law of energy conservation, the output power of the source converters is identical or at least similar if their input power is identical or at least similar (provided that the conversion efficiency of the source converters is identical or at least similar).

Each current regulator controls the input current of a particular source converter by comparing its actual input current to a reference current and matching this input current to the reference current. The reference current is the same for each current regulator or in other words, it is a common reference current.

An advantage of this load balancing is that it requires the generation of just one single reference current, which results in a simple design and low production costs. Moreover, requirement of exactly one single reference current is inherent to the functional principle of this balancing control. Or in other words, this balancing control will not work with more then one reference current, because the output power of the source converters can only be balanced if it is ensured that— with identical input voltages—their input currents are identical. But having different reference currents and therewith different input currents of the source converters will not result in the same output power. The common reference current therefore is a key functionality of this embodiment to achieve balanced LLC output currents.

The reference current may be provided by an external current source. But in order to balance the LLC loads, the converter arrangement preferably comprises a voltage controller for generating the reference current. This single voltage controller thereby generates the reference current based on the output voltage of at least one of the source converters. Preferably, the output voltage of every single source converter is considered for generating the reference current. Reference current generation is preferably done by performing a comparison of the single or the multiple source converter output voltages to a suitable reference voltage and then generating the reference current based on a result of that comparison.

The above mentioned input capacitor is a part of the so called DC link capacitance which is understood as the capacitance formed by all capacitances that are connected to the respective DC link bus voltage feeding an LLC converter. This DC link capacitance performs as a power buffer when feeding the power output of a source converter to the input of the respective LLC converter. In case the output powers of the source converter and the respective LLC converter are unmatched, the power difference is fed to or drawn from the DC link capacitance, thereby increasing or decreasing the respective DC link voltage. Therefore, in case the LLC output currents are unbalanced, the LLC output powers are so as well since the current outputs are connected to a common output voltage bus. Due to the law of energy conservation the input power of the LLC converters is unbalanced too, i.e. in accordance with the unbalanced output power (provided that the conversion efficiency of the LLC converters is identical or at least similar). Because the source converters are feeding the DC links with the same power, the DC link voltage is going to increase for those LLC converters that draw less power than the others and its going to decrease for those LLC converters that draw more power than the others (assuming that the overall input and output power of the converter arrangement are matched). The speed of this dynamic process is given by the amount of power mismatch between the LLC converters, the DC link voltage level and the DC link capacitance. The process will continue until a steady state is reached in which the LLC converters draw equal or at least similar input power and supply equal or at least similar output power to the output voltage bus, thereby feeding matched output currents with equal or at least similar average values.

In the following, other preferred embodiments of converter arrangements with interleaved LLC converters and a load balancing control are described. It is to note that the following load balancing techniques can be applied additionally to the load balancing technique described above (LLC load balancing by balancing the input power of the source converters) or independently of it which means instead of it. Further, the embodiments described below can be used either separately of each other or in combination with one or more of the other embodiments as well.

In a preferred embodiment of the invention, the load balancing control comprises one input per single LLC converter. This has the advantage that from each single LLC converter, information can be separately and individually be supplied to the load balancing control. In a particularly preferred embodiment, the load balancing control comprises exactly one input per single LLC converter. This has the advantage that the number of ports and/or wirings in the converter arrangement is minimized and that the converter arrangement is therefore comparably simple. However, the balancing control can also comprise more than one input per single LLC converter, for example electrical variables measured at different points of each single LLC converter, or even less than one input per single LLC converter, for example one input for two or three LLC converters taken together.

In a preferred embodiment, the load balancing control comprises one output per single LLC converter. This has the advantage that each single LLC converter can be separately controlled in respect of its balancing. This has the advantage that the number of ports and/or wirings in the converter arrangement is minimized and that the converter arrangement is therefore comparably simple. However, the balancing control can also comprise more than one output per single LLC converter, for example different electrical variables for influencing the behavior of each single LLC converter at different locations, or even less than one output per single LLC converter, for example one output for two or three LLC converters taken together.

In a preferred embodiment, the load balancing control is configured to use output currents of the single LLC converters as input variables. This is advantageous because the output currents are ideal for determining a load mismatch of the converter arrangement, for example to the range of their amplitudes and their phase shifts. However, it is also possible that the load balancing control uses other information of the single LLC converters like other currents and/or voltages (such as currents and/or voltages measured at different points inside each single LLC converter), as input variables.

In a typical embodiment, the load balancing control is configured to determine a specific phase information for each pulse generator and preferably also to supply this specific phase information to each pulse generator. Such a phase information has the advantage that it can for example be used to introduce a phase shift into the switching of two of the four switches of each single LLC converter, preferably into the switching of two diagonal switches of each single LLC converter. The load balancing control can, however also be configured to supply other types of information to the pulse generators or yet to other components of the converter arrangement.

In a preferred embodiment the load balancing control is configured to compare the output currents of the single LLC converters to each other. This has the advantage that a corresponding action of the load balancing control can be based on the comparison of the behaviour of all single LLC converters. However, it is also possible that the load balancing control is configured to compare other variables related to the behaviour of the converter arrangement and/or the single LLC converters, like currents or voltages tapped at other locations inside the converter arrangement, to each other.

In a particularly preferred embodiment, the load balancing control is configured to balance a loading between the single LLC converters by applying more phase-shift to a single LLC converter that is more loaded than another single LLC converter and/or applying less phase-shift to a single LLC converter that is less loaded than another single LLC converter. It is particularly advantageous if the more and/or less phase shift is applied to at least two, preferably diagonal, switches of the single LLC converters, preferably of each single LLC converter. Introducing a phase shift to at least certain pairs of switches in the LLC converters leads to a comparably simple and yet reliable way of balancing the loads of the converter arrangement according to the invention. However, phase shifting configurations other than the one explained above are, in principle, also possible. In a more general phase shifting configuration, the phase shift is introduced between the turn-off switching events of at least two, preferably diagonal, switches of the single LLC converters. The turn-on switching events of every switch may be delayed in any appropriate manner. In a particularly preferred embodiment, the load balancing control is configured to carry out the described phase shifting modulation in such a way that a resonantcurrent-depending, adaptive delay of the turn-on edges of the switches, which can for example be field effect transistors, is used.

In preferred embodiments, the converter arrangement comprises a multi-link input source comprising one DC voltage link per single LLC converter. Each DC voltage link of the multi-link input source is preferably connected to the input voltage of one single LLC converter. The use of such a multi-link input source has the advantage that the DC input voltage for each single LLC converter can be determined separately by the balancing control and the load mismatch can thereby be corrected through application of appropriate DC input voltages to the concerned single LLC converters. However, it is also possible to use a multi-link input source that supplies multiple DC voltage links wherein each voltage serves as an input to at two or more single LLC converters.

In a typical embodiment, the multi-link input source comprises a Vienna-rectifier (typically a unidirectional three-phase, three-switch, three-level rectifier using pulse-width modulation (PWM)) and/or multiple single (single phase and/or single rail) PFC rectifiers (rectifiers using power factor correction (PFC)), preferably one single PFC rectifier per single LLC converter, and/or a three-phase Y-rectifier (typically formed by a star connection of three single-phase unity power factor rectifier systems). However it is also possible to use different types of input sources as long as they are able to supply at least two different DC voltage links, preferably one single DC voltage link per single LLC converter.

In a preferred embodiment, the load balancing control is configured to determine a specific voltage information for each DC voltage link of the multi-link input source, preferably as a function of the input to the balancing control from the different single LLC converters. This has the advantage that quick and straightforward reaction to a load mismatch of the converter arrangement is obtained due to the translation of the output current of each single LLC converter into a corresponding DC input voltage for each single LLC converter. It is however also possible for the load balancing control to determine another information than a voltage information to the multi-link input source, for example merely a boolean value for each single LLC converter which is true when the corresponding voltage needs to be increased and false when it needs to be decreased.

In a particularly preferred embodiment, the load balancing control and/or the multi-link input source are/is configured to balance a loading between the single LLC converters by decreasing an input voltage of a single LLC converter that is more loaded than another single LLC converter and/or increasing an input voltage of a single LLC converter that is less loaded than another single LLC converter. Preferably, the input voltage(s) is/are decreased and/or increased by adapting the specific voltage information supplied by the balancing control to the multi-link input source for each DC voltage link. Such a configuration of the load balancing control and/or the multi-link input source is advantageous because it is particularly easy to implement in the balancing control (e.g. as a PI controller) and because it leads to a good load mismatch correction/load balancing at the same time. Other configurations of the load balancing control and/or the multi-link input source are, however, also possible as long as the overall goal—i.e. to obtain a good load balancing—is obtained through appropriate control of the multi-link input source.

In a preferred embodiment, the load balancing control is integrated in the multi-link input source. However, the load balancing control can also only be connected to the multi-link input source in such a way that the load balancing control and the multi-link input source form a logical entity, for example through appropriate connections. A physical integration of the components is not absolutely necessary.

In an advantageous embodiment, the load balancing control is configured to balance a loading between the single LLC converters by balancing supply powers to the several voltage links of the multi-link input source. This has the advantage to allow a comparably simple load balancing.

In a method according to the invention, for operating a converter arrangement comprising at least two single LLC converters, at least one pulse generator per single LLC converter and a control unit, as well as—preferably—an input capacitor, an output capacitor, wherein
  each pulse generator supplies switching pulses to one single LLC converter and
  switching frequency control and/or phase-shift control is used to control the pulse generators,
the control unit continuously monitors the loads of the single LLC converters and performs a load balancing routine, preferably an active load balancing routine, for overcoming unbalanced loading of the converter arrangement.

The use of such a load balancing routine has the advantage that load mismatch and/or unstable and/or inefficient operation of the converter arrangement can be avoided.

In a preferred embodiment, the method for operating a converter arrangement is a method for operating an LLC converter arrangement. In a further preferred embodiment, each single LLC converter comprises four switches.

In a preferred embodiment of the method according to the invention, each LLC converter is supplied with a supply voltage by exactly one source converter, particularly a PFC boost converter. Performing the load balancing routine then comprises the step of balancing an input power of the source converters.

In a further preferred embodiment balancing of the input power of the source converters comprises balancing an input current of each source converter by comparing the input current of each source converter to a common reference current and matching each input current to the common reference current.

In another preferred embodiment, the reference current is generated based on an output voltage of the source converters, in particular by performing a comparison of the output voltage of the at least one source converter and a reference voltage and generating the reference current based on a result of that comparison.

In the following, other preferred embodiments of a method according to the invention are disclosed. It is to note that these load balancing methods can—as far as possible—be applied additionally to the load balancing method described above (LLC load balancing by balancing the input power of the source converters) or independently of it which means instead of it.

In a preferred embodiment, the load balancing routine uses one variable per single LLC converter, preferably an output current of the single LLC converter, as input variables and/or the load balancing routine supplies one output information per single LLC converter. The advantage of a balancing routine functioning in this way is that it is possible for the balancing routine to take into account the performance for each single LLC converter and to influence the performance of each single LLC converter separately. However, it is also possible that the load balancing routine uses other variables such as voltages and/or input and/or outputs only for selected single LLC converters and/or for groups of single LLC converters.

In a typical embodiment, the load balancing routine determines a specific phase information for each pulse generator, preferably by comparing the output currents of the single LLC converters to each other. Preferably, the load balancing routine then supplies this specific phase information to each pulse generator. This has the advantage that each pulse generator is able to react to the loading of its respective single LLC converter separately, which leads to a particularly precise load balancing. However, other configurations of the load balancing routine, e.g. the use of common phase in formations for groups of single LLC converters are in principle also possible.

In a preferred embodiment, the load balancing routine balances a loading between the single LLC converters by applying more phase-shift to a single LLC converter that is more loaded than another single LLC converter and/or by applying less phase-shift to a single LLC converter that is less loaded than another single LLC converter. It is particularly preferred if the load balancing routine applies more phase-shift to a pair of preferably diagonal switches, e.g. MOSFETs, of a single LLC converter that is more loaded than another single LLC converter and/or by applying less phase-shift to a pair of preferably diagonal switches, e.g. MOSFETs, of a single LLC converter that is less loaded than another single LLC converter.

In a typical embodiment, the load balancing routine balances a loading between the single LLC converters by determining a specific voltage information for each single LLC converter and preferably by supplying this specific voltage information to a multi-link input source which supplies a distinct input voltage according to the specific voltage information to every single LLC converter.

In a preferred embodiment, an interleave phase-shift between the single LLC converters is readjusted dynamically. This has, for example, the advantage of sustaining best current ripple cancellations of input and output currents.

In a typical embodiment, the load balancing routine balances a loading between the single LLC converters by determining a specific power information for each single LLC converter and/or a specific power information for a voltage link of each single LLC converter. This leads to a simple way of load balancing: since the output voltage is the same for every single LLC converter, the output currents are balanced if the input and/or output powers are balanced.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

PREFERRED EMBODIMENTS

Figure 1:
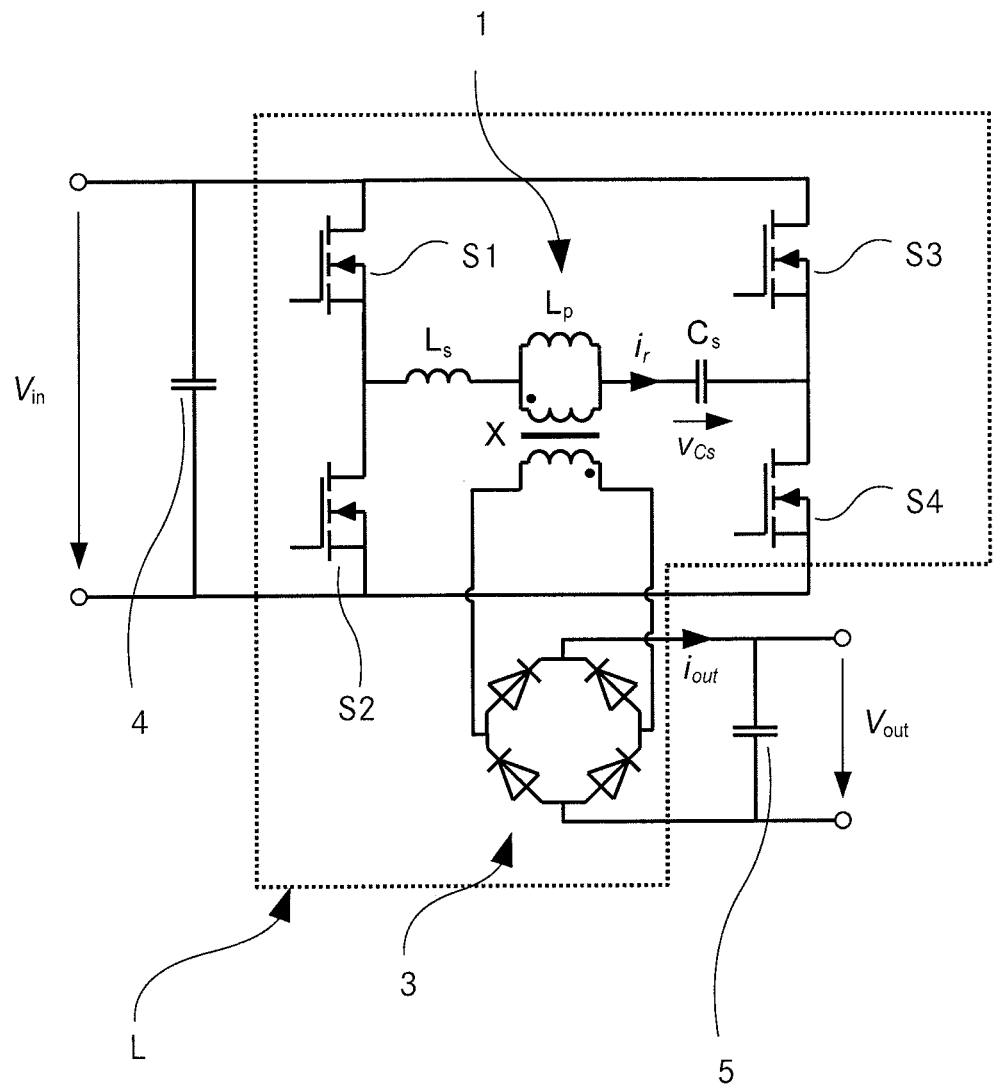
FIG. 1: Commonly known LLC converter basic structure.

The invention is based on the commonly known structure of the LLC converter L as shown in FIG. 1. The LLC converter L comprises a resonant circuit 1, an inverter comprising four switches S1, S2, S3 and S4 and a rectifier 3. The LLC converter L is combined with an input capacitance 4 and an output capacitance 5. The rectifier can be of full-wave or center-tapped type, realized by diodes or by MOSFETs for the purpose of synchronous rectification. The arrangement order of the resonant circuit 1 elements $L_s, L_p \| X, C_s$ is arbitrary, they could as well be divided into several sub-elements that sum to the original value. The inverter is shown as full-bridge type; this configuration is necessary for the embodiment and method of the invention visualized in FIGS. 5 and 6. However, in certain cases such as the embodiment and method of the invention visualized in FIGS. 7, 8, 9 and 10 the inverter may either be of full-bridge type or of half-bridge type.

Figure 2:
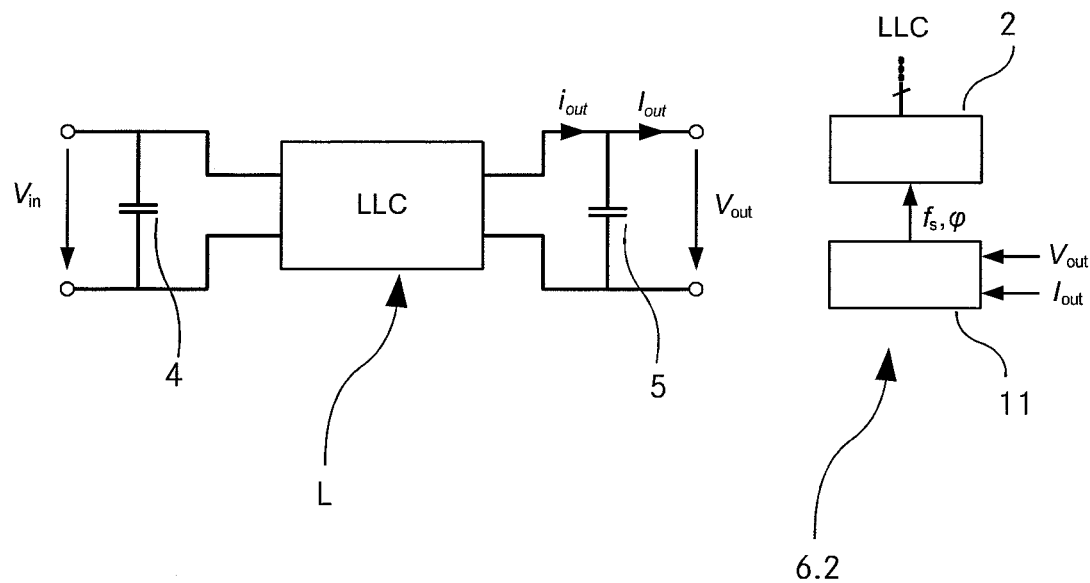
FIG. 2: Simplified block diagram of basic control structure applied to a single LLC converter.

FIG. 2 shows a simplified block diagram of a single LLC converter L and a corresponding control structure 6.2 comprising an output controller 11 and a pulse generator 2 for commanding the switches S1, S2, S3 and S4 (not explicitely shown in FIG. 2) of the single LLC converter L. In this setup, the LLC converter L uses the commonly known methods of output control, i.e. to control the output voltage $V_{out}$ or the output current $I_{out}$. The output controller 11 compares the measured quantities of output voltage $V_{out}$ or output current $I_{out}$ with a desired set value and uses switching frequency ($f_s$) control and/or phase-shift ($\phi$) control to realize the set value by controlling the pulse generator 2 appropriately.

Figure 3:
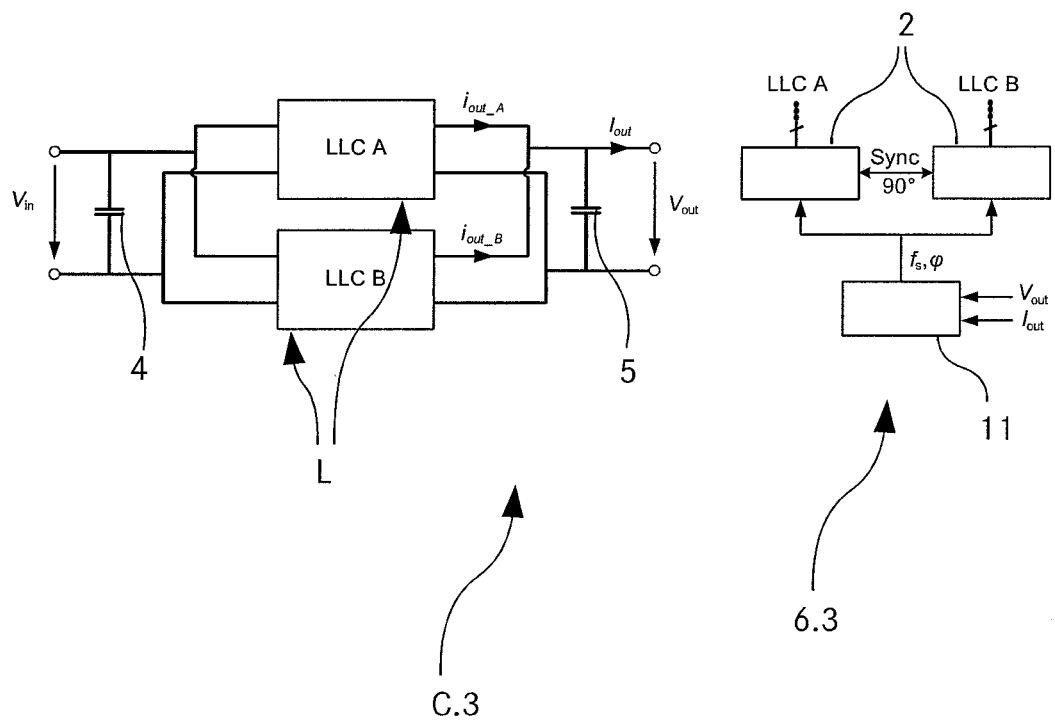
FIG. 3: Simplified block diagram of prior-art control structure for interleaved LLC converters.

Based on the single LLC structure shown in FIG. 2, the prior-art structure of interleaved LLC converters L is shown in FIG. 3 for the case of two interleaved LLC converters L. The corresponding control structure 6.3 comprises one pulse generator 2 per single LLC converter L. The number of paralleled LLC converters L can be two or more with the appropriate phase-shift between the switching patterns of the two or more LLC converters L applied. In case of two converters, the phase-shift between the switching patterns of both LLC converters L, designated in the following as interleave phase-shift, should be around 90°, which must be realized by appropriate synchronization between the pulse generators 2 of each LLC converter L.

Figure 4:
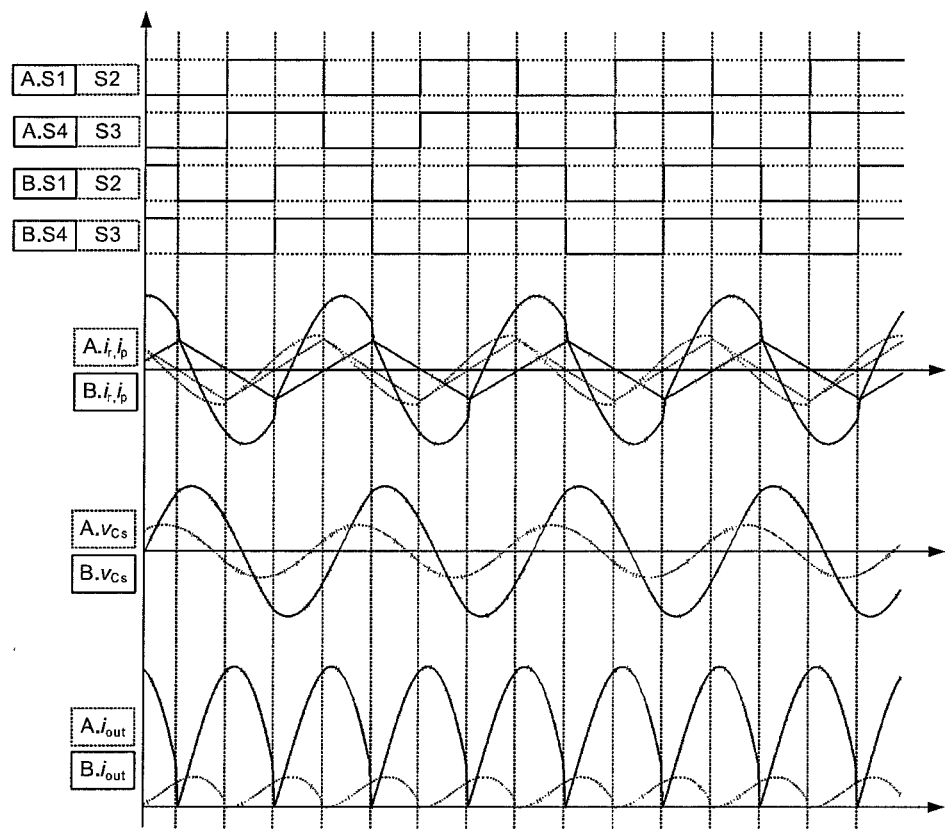
FIG. 4: Switching patterns and waveforms for interleaved LLC converters with no balancing measures applied.

FIG. 4 shows switching patterns and waveforms in case of two interleaved LLC converters L with 90° interleave phase shift and an example mismatch between the circuit element values of both LLC converters L. Though the mismatch is not high in terms of what can be economically and practically reached, the load is very unbalanced between the LLC converters L as can be seen by the fact that $A.i_{out} \ll B.i_{out}$.

Figure 5:
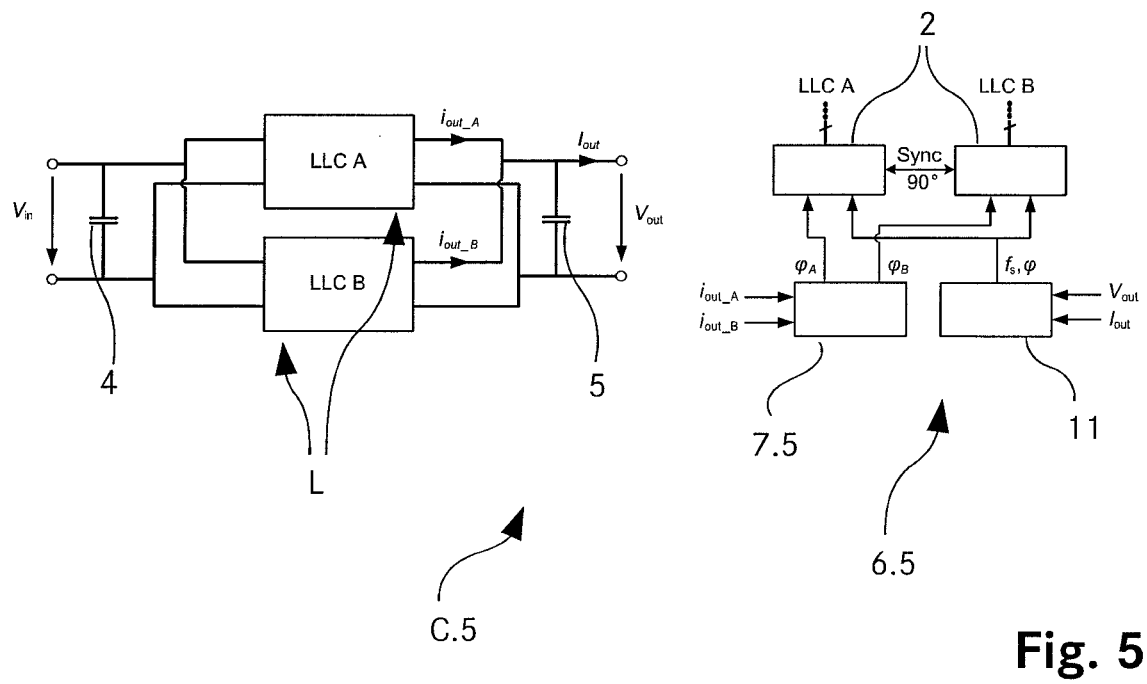
FIG. 5: Simplified block diagram of a first embodiment of the invention: proposed control structure for interleaved LLC converters including load balancing control.

FIG. 5 now shows a first embodiment of a converter arrangement C.5 according to the invention which has the objective to overcome the unbalanced loading at component value mismatch shown in FIG. 4. An active load balancing control 7.5 is added to the control structure 6.5. Its inputs are the measured output currents of the single converters (here: $i_{out\_A}$ and $i_{out\_B}$). The load balancing control 7.5 compares the single output currents to each other and takes action in order to balance the loading between the single LLC converters L by either applying more phase-shift (here: $\phi_A$ resp. $\phi_B$) to the single LLC converter L that is more loaded than the other or applying less phase-shift to the single LLC converter L that is less loaded than the other or by combining both actions. "Applying more phase-shift to the converter" is to be understood as "increasing a switching delay between the switches S1 and S4 (or the switches S2 and S3), at least between the turn-off switching events of the switches S1 and S4 (or S2 and S3) of the respective single LLC converter L" whereas "applying less phase-shift" is to be understood as "decreasing the switching delay between the switches S1 and S4 (or the switches S2 and S3), at least between the turn-off switching events of the switches S1 and S4 (or S2 and S3) of the respective single LLC converter L". In a converter arrangement with more than two single LLC converters L (this case is not shown in FIG. 5), the load balancing control 7.5 would compare the single output currents to each other and would take action in order to balance the loading between the single LLC converters L by either applying more phase-shift (here: $\phi_A$ resp. $\phi_B$) to the single LLC converters L that are more loaded than the others or applying less phase-shift to the single LLC converters L that are less loaded than the others or by combining both actions. When altering the phase-shifts applied to the single LLC converters L, it may be convenient to readjust the interleave phase-shift in order to sustain e.g. best current ripple cancellation of input and output currents.

Figure 6:
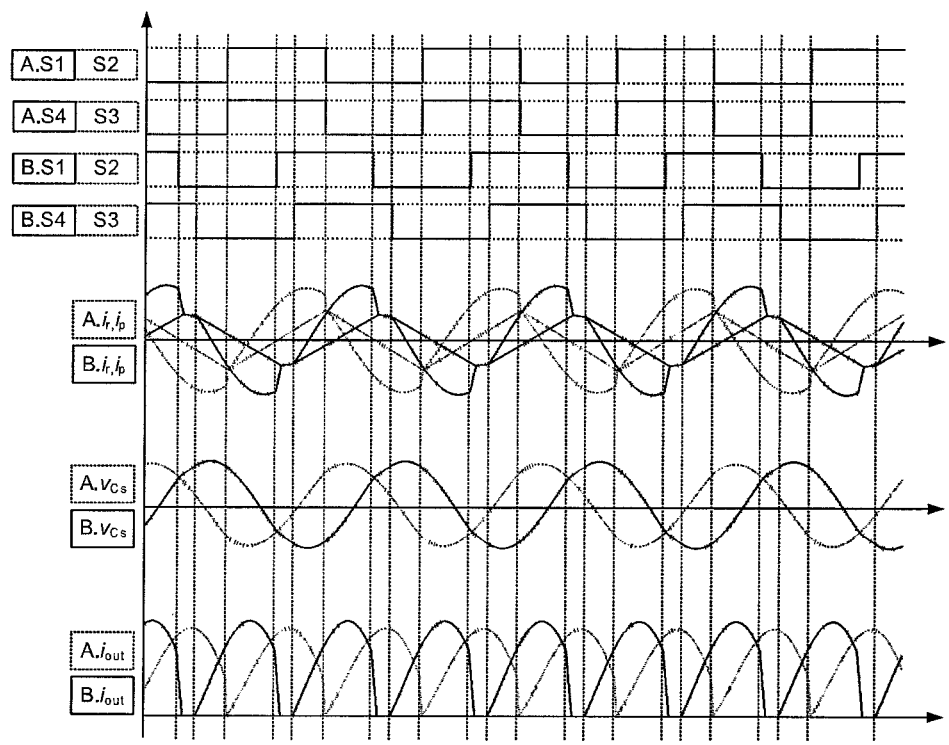
FIG. 6: Switching patterns and waveforms for interleaved LLC converters with balancing routine according to first embodiment of invention applied.

FIG. 6 shows switching patterns and waveforms when the load balancing routine characteristic for the first embodiment as shown in FIG. 5 is applied in case of the component value mismatch example used already in FIG. 4. It can be seen that a switching delay is applied between the diagonal switches S1 and S4 of the single LLC converter "LLC B". This switching delay or phase shift leads to a considerable load balancing as can be seen by looking at the currents $A.i_{out}$ and $B.i_{out}$ at the bottom of FIG. 6.

Figure 7:
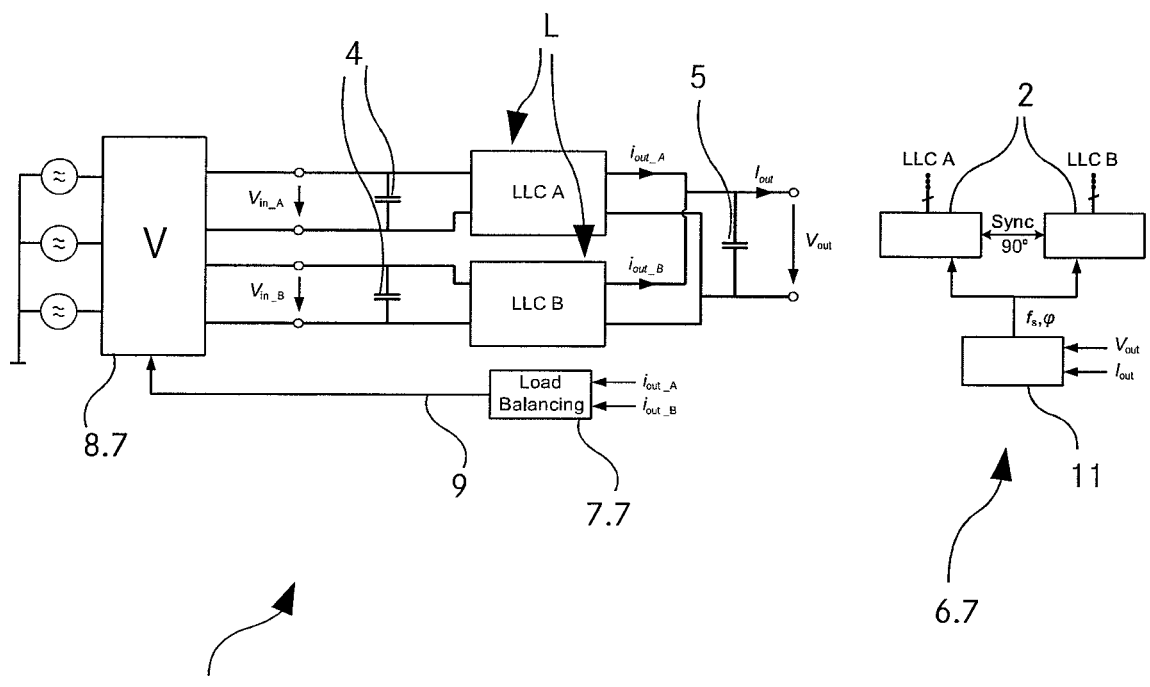
FIG. 7: Simplified block diagram of a second embodiment of the invention: proposed control structure for interleaved LLC converters including load balancing control,
FIG. 8 Simplified block diagram of a third embodiment of the invention: proposed control structure for interleaved LLC converters including load balancing control,
FIG. 9 Simplified block diagram of a fourth embodiment of the invention: proposed control structure for interleaved LLC converters including load balancing control.

FIG. 7 shows a second embodiment of the invention. The converter arrangement shown here comprises a multi-link input source 8.7 and a control link 9 to this multi-link input source 8.7. The multi-link input source 8.7 is characterized by that it provides two DC voltage links and each of the links is connected to the input voltage of one single LLC converter L (here: $V_{in\_A}$ and $V_{in\_B}$). Furthermore, it is required that the input voltages supplied by the multi-link input source 8.7 can be adjusted within an appropriate range by using the control link 9. Examples for an applicable multi-link input source are the Vienna-rectifier in case of two interleaved single LLC converters L or multiple single (single phase and/or single rail) PFC rectifiers in case of an arbitrary number of interleaved single LLC converters L or a three-phase Y-rectifier facilitating three (or a multiple of three) independently adjustable input voltages for the single LLC converters L. In FIG. 7, the solution with a Vienna-rectifier connected to a three-phase alternating mains is shown. As in the embodiment shown in FIG. 5, an active load balancing control 7.7 is added to the converter arrangement. However, in contrast to the active load balancing control 7.5 shown in FIG. 5, it is not shown as an integrated component of the control structure 6.7, but rather as an independent part of the converter arrangement. It is, however, also possible to integrate the active load balancing control 7.7 into the control structure 6.7. The inputs of the active load balancing control 7.7 are the measured output currents of the single LLC converters L (here: $i_{out\_A}$, and $i_{out\_B}$). The load balancing control 7.7 compares the single output currents to each other and takes action in order to balance the loading between the single LLC converters L by either decreasing the input voltage of the single LLC converter L that is more loaded than the other or by increasing the input voltage of the single LLC converter L that is less loaded than the other or by combining both actions. In a converter arrangement with more than two single LLC converters L (this case is not shown in FIG. 7), the load balancing control 7.7 would compare the single output currents to each other and would take action in order to balance the loading between the single LLC converters L by either decreasing the input voltages of the single LLC converters L that are more loaded than the others or by increasing the input voltages of the single LLC converters L that are less loaded than the others or by combining both actions.

Figure 8:
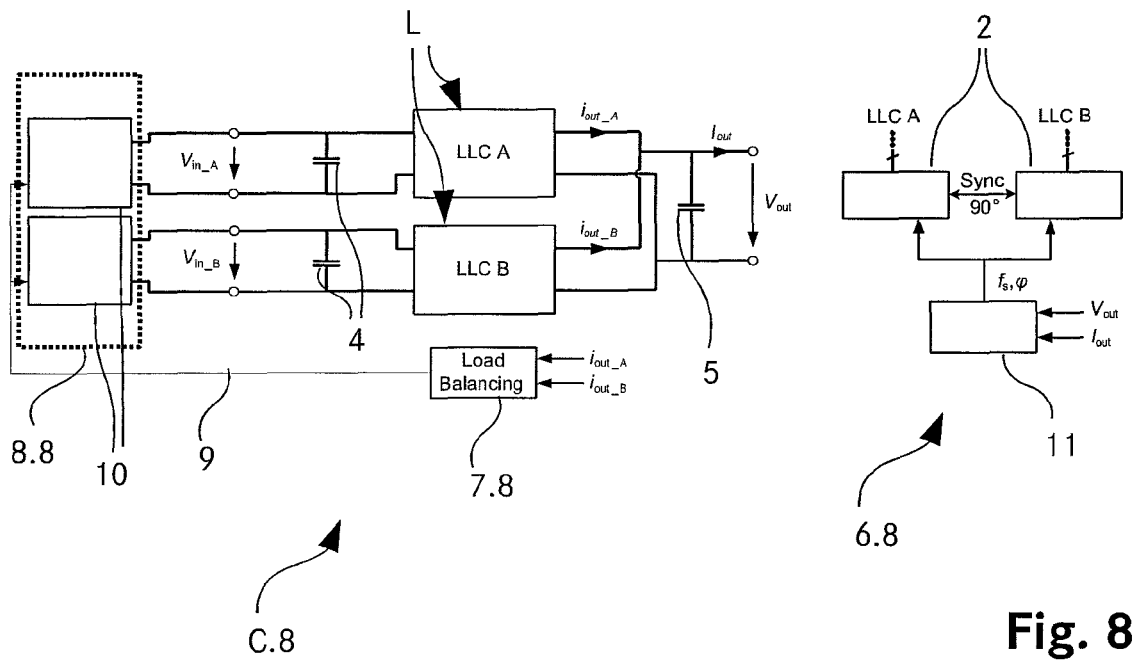
Figure 9:
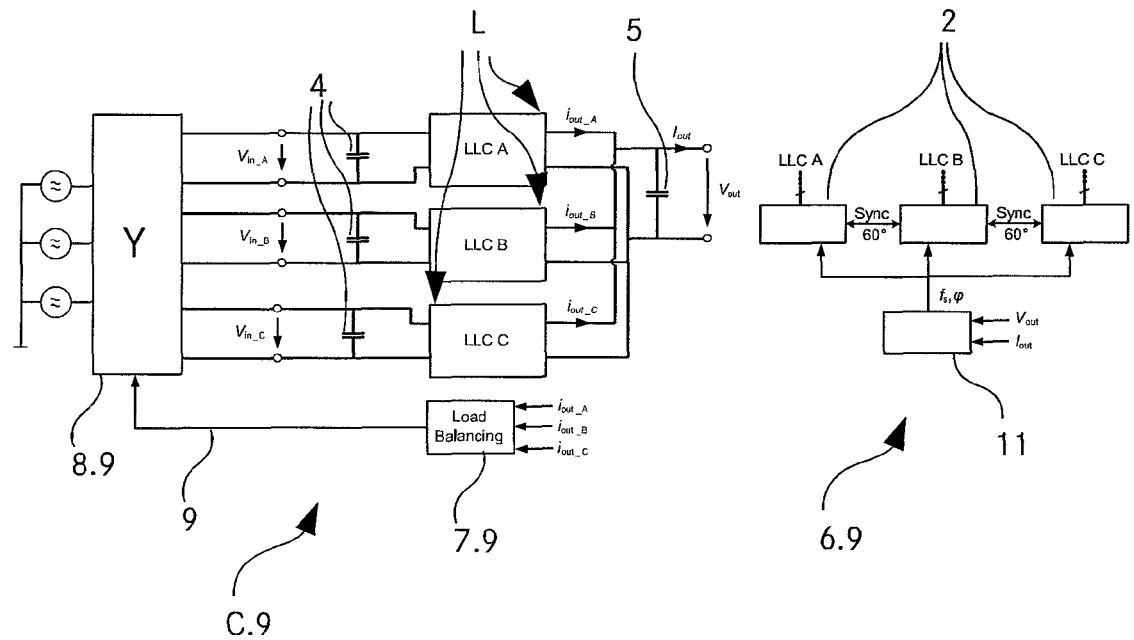

FIGS. 8 and 9 show a third and a fourth embodiment of the invention, respectively. In FIG. 8, a multi-link power source 8.8 comprising two single PFC rectifiers 10 is used. Each of the PFC rectifiers 10 supplies an input voltage to one single LLC converter L of the converter arrangement C.8. The embodiment shown in FIG. 9 uses a three phase Y-rectifier to supply three input voltages to a converter arrangement C.9 comprising three single LLC converters L.

Figure 10:
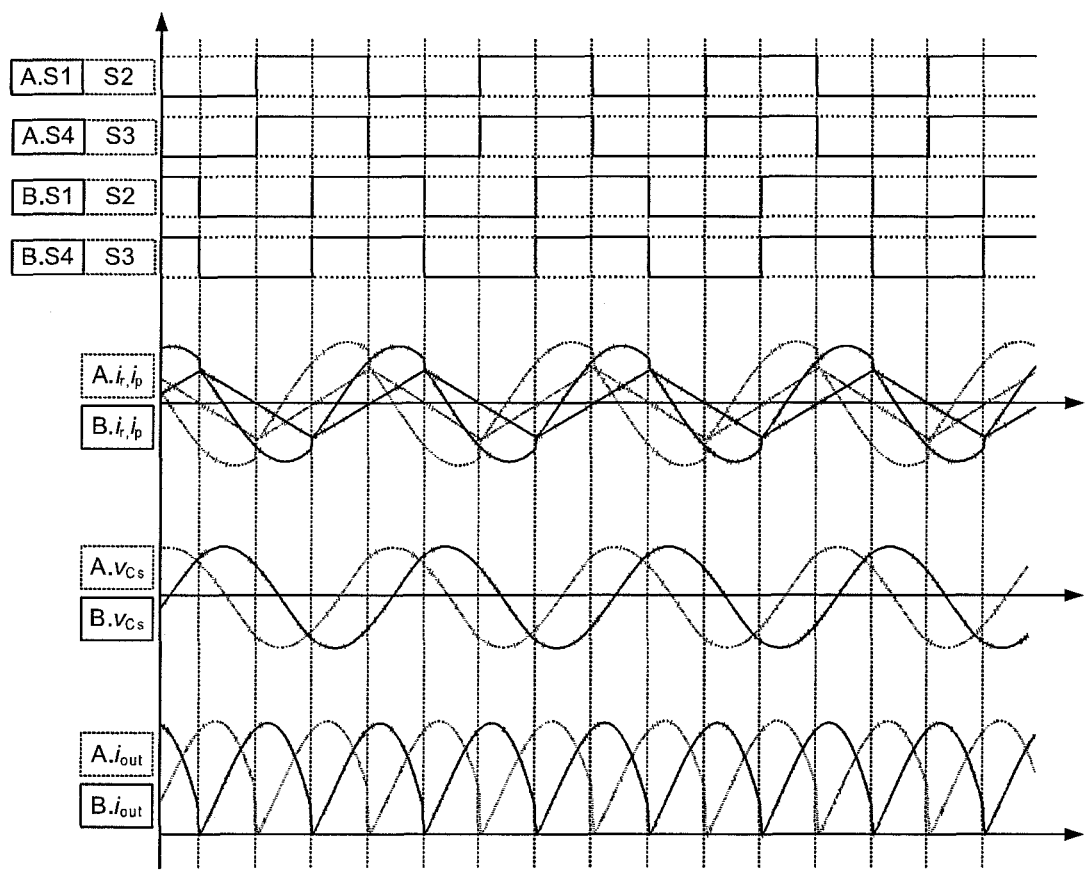
FIG. 10: Switching patterns and waveforms for interleaved LLC converters with balancing routine according to second embodiment of invention applied.

FIG. 10 shows switching patterns and waveforms when the load balancing routine characteristic for the second embodiment as shown in FIG. 7 is applied in case of the component value mismatch example used already in FIG. 4. As can be seen at the bottom of FIG. 10, the application of this load balancing routine leads to a considerable load balancing visualized by the homogenized waveforms the currents $A.i_{out}$ and $B.i_{out}$.

Figure 11:
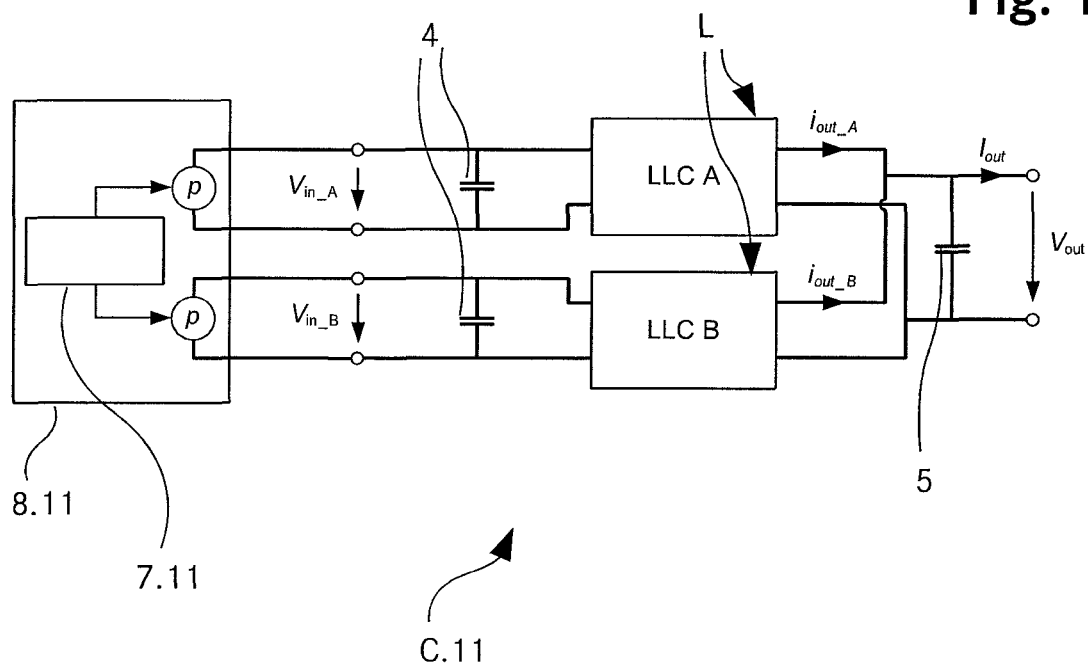
FIG. 11: Simplified block diagram of a fifth embodiment of the invention: proposed control structure for interleaved LLC converters including load balancing control.

FIG. 11 shows a fifth embodiment of the invention. The converter arrangement C.11 comprises a multi-link input source 8.11 and a load balancing control 7.11. The load balancing control 7.11 is located within the multi-link input source 8.11, i.e. it is integrated in the multi-link input source 8.11. The load balancing control 7.11 has a power balancing configuration. By balancing the supply power to the two input voltage links, the output power of the two single LLC converters L are balanced as well. Because the output voltage is same for every single LLC converter, the several output currents are balanced as the output powers are balanced.

Figure 12:
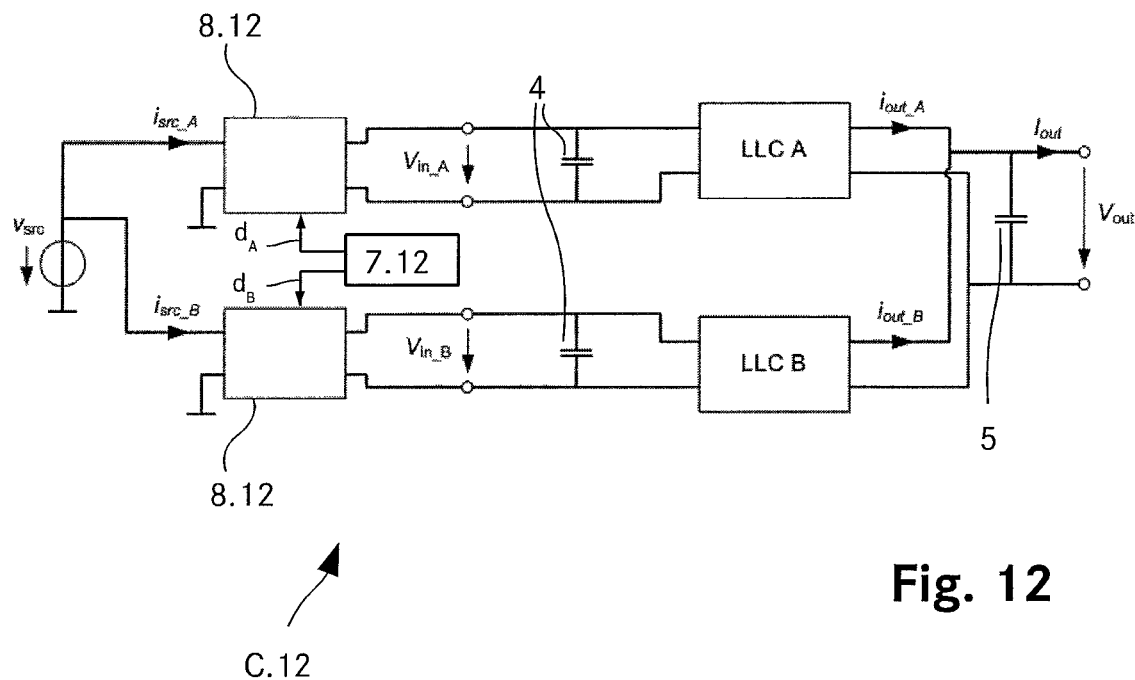
FIG. 12: Simplified block diagram of a sixth embodiment of the invention: proposed control structure for interleaved LLC converters including load balancing control.
Figure 13:
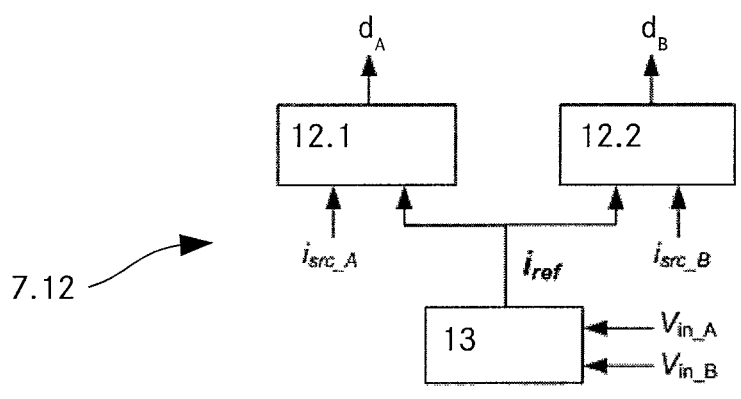
FIG. 13: Simplified block diagram of the load balancing control of the sixth embodiment of the invention.

FIG. 12 shows a sixth embodiment of the invention. The converter arrangement C.12 comprises two interleaved LLC converters LLC A and LLC B and two PFC-boost converters as source converters 8.12, one for each LLC converter. Both source converters 8.12 are connected in parallel to the same voltage source $V_{src}$. The converter arrangement C.12 further comprises a load balancing control 7.12 which provides a control signal $d_A$, $d_B$ to each source converter 8.12 such that the input currents $i_{src\_A}$ and $i_{src\_B}$ of the source converters 8.12 matches a reference current.

Generally, the input power of a source converter is given by the product of the input voltage and the input current. In case of PFC-boost converters that are connected to an AC line, the input power $Pin_{srcx}$ of each source converter is calculated by $$P_{in_{src_x}} = \int_0^{AC\text{-}Period} (v_{src}(t) * i_{src_x}(t)) dt$$

where $V_{src}$ is the input voltage, $i_{src_x}$ is the input current of converter number x and AC-Period designates the period of the AC line signal.

The load balancing control 7.12 comprises a voltage controller 13 which receives the output voltages $V_{in\_A}$, $V_{in\_B}$ of the source converters as input signals and generates a reference current $i_{ref}$ based on the output voltages $V_{in\_A}$, $V_{in\_B}$ and a reference voltage (not shown) where the reference voltage is either generated internally or fed to the voltage controller 13. The reference current $i_{ref}$ is generated by comparing the output voltages $V_{in\_A}$, $V_{in\_B}$ to the reference voltage and generating the reference current $i_{ref}$ based on a result of that comparison. The load balancing control 7.12 further comprises two current regulators 12.1, 12.2 which both receive the reference current $i_{ref}$ and one of the currents $i_{src\_A}$ and $i_{src\_B}$ respectively. The current regulators 12.1, 12.2 regulate the input currents $i_{src\_A}$ and $i_{scr\_B}$ by measuring them, comparing them to the reference current $i_{ref}$, generating a control signal $d_A$, $d_B$ for each of the source converters 8.12 based on the result of this comparison and providing the control signals $d_A$, $d_B$ to the respective source converters 8.12.

If the current regulators 12.1, 12.2 are working sufficiently in terms of speed and accuracy, the input currents $i_{src\_A}$ and $i_{src\_B}$ are identical (or at least similar) and both match the reference current $i_{ref}$. And hence also the input powers of the source converters 8.12 are identical (or at least similar).

The output power of the source converters 8.12 is fed to the power input of the respective LLC converter (L). The DC link capacitance of each DC link from a source converter 8.12 to the corresponding LLC converter (L), which includes input capacitance 4 as well as every other capacitance connected to that DC link, thereby performs as a power buffer. In case the output currents $i_{out\_A}$ and $i_{out\_B}$ of the LLC converters (L) are unbalanced, the LLC output powers $P_{out\_A}$, $P_{out\_B}$ are so as well since the current outputs are connected to a common output voltage bus, which can be seen from the following equations:

$$P_{out\_A} = V_{out} * \overline{i_{out\_A}} \text{ and } P_{out\_B} = V_{out} * \overline{i_{out\_B}}$$

where $V_{out}$ is the voltage of the output voltage bus. The input power of the LLC converters (L) will be unbalanced in accordance to the unbalanced output currents $T_{out\_A}$ and $i_{out\_B}$. Because both source converters are feeding the DC links with the same power, the DC link voltage is going to increase for the LLC converter that draws less power than the other one and its going to decrease for the LLC converter that draws more power than the other one, thereby assuming that the overall input and output power of the converter arrangement are matched.

In summary, it is to be noted that the invention is not limited to the embodiments described in this section. The scope of protection is rather set up by the claims.

REFERENCE LIST

| | |
|---|---|
| 1 | Resonant circuit |
| 2 | Pulse generator |
| 3 | Rectifier |
| 4 | Input capacitance |
| 5 | Output capacitance |
| 6.2, 6.3, 6.5, 6.7, 6.8, 6.9 | Control structure |
| 7.5, 7.7, 7.8, 7.9, 7.11, 7.12 | Load balancing control |
| 8.7, 8.8, 8.9, 8.11 | Multi-link input source |
| 8.12 | Source converter |
| 9 | Control link |
| 10 | PFC rectifier |
| 11 | Output controller |
| 12.1, 12.2 | Current regulator |
| 13 | Voltage controller |
| C.5, C.7, C.8, C.9, C.11, C.12 | Converter arrangement |
| $d_A$, $d_B$ | Control signal |
| L | LLC converter |
| S1, S2, S3, S4 | Switch |

The invention claimed is:

1. A converter arrangement, comprising:
   a) at least two single LLC converters,
   b) a pulse generator per single LLC converter, wherein each pulse generator is configured to supply switching pulses to one single LLC converter,
   c) an output controller configured to use a switching frequency control and/or a phase-shift control to control the pulse generators,
   d) a load balancing control for controlling load balancing of the converter arrangement,
   e) a source converter, particularly a PFC boost converter, per LLC converter,
   f) wherein each source converter is connected to an input of exactly one LLC converter to supply a supply voltage to the LLC converter, and
   g) wherein each source converter is configured to be fed by a common voltage source, and
   h) wherein the load balancing control is configured to balance an input power of the source converters, and
   i) wherein the load balancing control comprises a current regulator per source converter for balancing an input current of the source converters by comparing each input current to a common reference current and matching the input currents to the common reference current.

2. The converter arrangement according to claim 1, wherein the load balancing control comprises a voltage controller for generating the reference current based on an output voltage of at least one of the source converters, preferably by performing a comparison of the output voltage of the at least one source converter and a reference voltage and generating the reference current based on a result of that comparison.

3. The converter arrangement according to claim 1, wherein the load balancing control comprises one input per single LLC converter.

4. The converter arrangement according to claim 3, wherein the load balancing control comprises one output per single LLC converter.

5. The converter arrangement according to claim 3, wherein the load balancing control is configured to use output currents of the single LLC converters as input variables.

6. The converter arrangement according to claim 3, wherein the load balancing control is configured to determine a specific phase information for each pulse generator.

7. The converter arrangement according to claim 5, wherein the load balancing control is configured to compare the output currents of the single LLC converters to each other.

8. The converter arrangement according to claim 3, wherein the converter arrangement comprises a multi-link input source comprising one DC voltage link per single LLC converter.

9. The converter arrangement according to claim 8, wherein the multi-link input source comprises a Vienna-rectifier and/or multiple single PFC rectifiers and/or a three-phase Y-rectifier.

10. The converter arrangement according to claim 8, wherein the load balancing control is configured to determine a specific voltage information for each DC voltage link of the multi-link input source.

11. The converter arrangement according to claim 8, wherein the load balancing control is configured to balance a loading between the single LLC converters by decreasing an input voltage of a single LLC converter that is more loaded than another single LLC converter and/or increasing an input voltage of a single LLC converter that is less loaded than another single LLC converter.

12. The converter arrangement according to claim 8, wherein the load balancing control is integrated in the multi-link input source.

13. The converter arrangement according to claim 8, wherein the load balancing control is configured to balance a loading between the single LLC converters by balancing supply powers to the several voltage links of the multi-link input source.

14. A method for operating a converter arrangement, comprising at least two single LLC converters, a pulse generator per single LLC converter and a control unit, wherein
   a) each pulse generator supplies switching pulses to one single LLC converter, and
   b) switching frequency control and/or phase-shift control is used to control the pulse generators,
   c) the control unit continuously monitors the loads of the single LLC converters and performs a load balancing routine for controlling load balancing of the converter arrangement, and
   d) each LLC converter is supplied with a supply voltage by exactly one source converter, particularly a PFC boost converter, and
   e) performing the load balancing routine comprises balancing an input power of the source converters, and
   f) wherein balancing the input power of the source converters comprises balancing an input current of each source converter by comparing the input current to a common reference current and matching the input currents to the common reference current.

15. The method according to claim 14, wherein the reference current is generated based on an output voltage of the source converters, particularly by performing a comparison of the output voltage of the at least one source converter and a reference voltage and generating the reference current based on a result of that comparison.

16. The method according to claim 14, wherein the load balancing routine uses one variable per single LLC converter, preferably an output current of the single LLC converter, as input variables and/or the load balancing routine supplies one output information per single LLC converter.

17. The method according to claim 16, wherein the load balancing routine determines a specific phase information for each pulse generator, preferably by comparing the output currents of the single LLC converters to each other.

18. The method according to claim 16, wherein the load balancing routine balances a loading between the single LLC converters by determining a specific voltage information for each single LLC converter.

19. The method according to claim 16, wherein an interleave phase-shift between the single LLC converters is readjusted dynamically.

20. The method according to claim 16, wherein the load balancing routine balances a loading between the single LLC converters by determining a specific power information for each single LLC converter and/or a specific power information for a voltage link of each single LLC converter.

21. The converter arrangement according to claim 1, wherein the load balancing control comprises one input per single LLC converter.

22. The converter arrangement according to claim 1, wherein the load balancing control comprises one output per single LLC converter.

* * * * *

UNITED STATES PATENT AND TRADEMARK OFFICE
CERTIFICATE OF CORRECTION

PATENT NO. : 9,263,951 B2
APPLICATION NO. : 13/934971
DATED : February 16, 2016
INVENTOR(S) : Heiko Figge et al.

It is certified that error appears in the above-identified patent and that said Letters Patent is hereby corrected as shown below:

ON THE TITLE PAGE:

At item (71), Applicant, change "DET International Holding Limited, George Town, Grand Cayman, (KY) (US)" to --DET International Holding Limited, George Town, Grand Cayman (KY)--.

Signed and Sealed this
Twenty-fourth Day of May, 2016

Michelle K. Lee
*Director of the United States Patent and Trademark Office*